(12) United States Patent
Matsumoto et al.

(10) Patent No.: US 9,434,073 B2
(45) Date of Patent: Sep. 6, 2016

(54) ROBOT APPARATUS AND CONTROL METHOD THEREFOR

(71) Applicant: Toshiba Kikai Kabushiki Kaisha, Chiyoda-ku, Tokyo-to (JP)

(72) Inventors: Yuta Matsumoto, Numazu (JP); Yasunori Nishihara, Numazu (JP); Jun Fujita, Numazu (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/418,416

(22) PCT Filed: Aug. 1, 2013

(86) PCT No.: PCT/JP2013/070918
§ 371 (c)(1),
(2) Date: Jan. 29, 2015

(87) PCT Pub. No.: WO2014/021433
PCT Pub. Date: Feb. 6, 2014

(65) Prior Publication Data
US 2015/0258685 A1    Sep. 17, 2015

(30) Foreign Application Priority Data
Aug. 2, 2012  (JP) .................................. 2012-172007

(51) Int. Cl.
*B25J 9/00*  (2006.01)
*B25J 9/16*  (2006.01)

(52) U.S. Cl.
CPC ............. *B25J 9/1633* (2013.01); *B25J 9/1641* (2013.01); *G05B 2219/39181* (2013.01); *G05B 2219/39187* (2013.01); *G05B 2219/39194* (2013.01)

(58) Field of Classification Search
CPC combination set(s) only.
See application file for complete search history.

(56) References Cited

U.S. PATENT DOCUMENTS

| | | | |
|---|---|---|---|
| 4,641,251 A * | 2/1987 | Inoue | B25J 9/0081 180/8.6 |
| 4,791,588 A * | 12/1988 | Onda | G05B 19/423 700/260 |

(Continued)

FOREIGN PATENT DOCUMENTS

| | | |
|---|---|---|
| CN | 1265057 | 8/2000 |
| JP | 07-028527 | 1/1995 |

(Continued)

OTHER PUBLICATIONS

Ryo Kikyywe et al., "Discountinuous Friction Model with Finite-Time Covergence to Zero-Velocity", 10-th Robotics Symposia Proceedings, pp. 215-220, 2005.

(Continued)

*Primary Examiner* — Jonathan L Sample
(74) *Attorney, Agent, or Firm* — DLA Piper LLP US

(57) ABSTRACT

A robot apparatus (1) includes a control apparatus (3) which carries out correction with use of an estimated value of a joint torque estimation unit (53) which estimates a joint torque acting upon each of joints (20 to 25). The joint torque estimation unit (53) includes a Coulomb frictional force torque estimation unit (70), a viscous frictional torque estimation unit (71), and a transition interval arithmetic operation unit (72) which smoothens transition from the Coulomb frictional force torque estimation unit (70) to the viscous frictional force estimation unit (71) and transition from the viscous frictional force torque estimation unit (71) to the Coulomb frictional force torque estimation unit (70).

4 Claims, 8 Drawing Sheets

(56) References Cited

U.S. PATENT DOCUMENTS

| | | | | |
|---|---|---|---|---|
| 5,101,472 A * | 3/1992 | Repperger | ............... | B25J 9/163 700/261 |
| 6,385,508 B1 * | 5/2002 | McGee | ................. | B25J 9/0081 285/189 |
| 2007/0260356 A1 * | 11/2007 | Kock | .................... | B25J 9/1641 700/261 |
| 2009/0069942 A1 * | 3/2009 | Takahashi | .............. | B25J 9/1633 700/260 |
| 2010/0094312 A1 * | 4/2010 | Ruiz Morales | ........ | B25J 13/085 606/130 |
| 2011/0060460 A1 * | 3/2011 | Oga | ........................ | B25J 9/1633 700/254 |
| 2012/0022690 A1 * | 1/2012 | Ooga | ..................... | B25J 9/1633 700/258 |
| 2012/0143376 A1 * | 6/2012 | Seo | ...................... | B62D 57/032 700/261 |
| 2012/0150347 A1 * | 6/2012 | Ohga | ..................... | B25J 9/1633 700/254 |
| 2012/0158181 A1 * | 6/2012 | Seo | ...................... | B62D 57/032 700/261 |
| 2012/0310412 A1 * | 12/2012 | Seo | ........................ | B25J 9/0006 700/254 |

FOREIGN PATENT DOCUMENTS

| | | |
|---|---|---|
| JP | 07-333084 | 12/1995 |
| JP | 2006-146572 | 6/2006 |
| JP | 2010-076012 | 4/2010 |

OTHER PUBLICATIONS

English Language Abstract and Translation of JP 07-028527 published Jan. 31, 1995.

English Language Abstract and Translation of JP 07-333084 published Dec. 22, 1995.

Written Opinion of International Searching Authority issued in PCT/JP2013/070918 dated Oct. 15, 2013.

English Language Translation Section V of Written Opinion of International Searching Authority issued in PCT/JP2013-070918 dated Oct. 15, 2013.

English Language Abstract and Translation of JP 2006-146572 published Jun. 8, 2006.

English Language Abstract and Translation of JP 2010-076012 published Apr. 8, 2010.

International Search Report issued in PCT/JP2013/070918 dated Oct. 1, 2013.

English Language Translation of International Search Report issued in PCT/JP2013/070918 dated Oct. 1, 2013.

Chinese Office Action issued in CN 201380041006.7 dated Jul. 29, 2015 with English language translation.

English Language Abstract for CN 1265057 published Aug. 30, 2000.

English Language Translation for Written Opinion of the International Searching Authority dated Oct. 15, 2013.

* cited by examiner

ROBOT APPARATUS AND CONTROL METHOD THEREFOR

CROSS REFERENCE TO RELATED APPLICATIONS

This application is a U.S. National Stage Application of International Application No. PCT/JP2013/070918 filed Aug. 1, 2013, which claims priority from Japanese Patent Application No. 2012-172007 filed Aug. 2, 2012. The entirety of all the above-listed applications are incorporated herein by reference.

TECHNICAL FIELD

The present invention relates to a robot apparatus whose joint is driven by a drive motor and a control method for the robot apparatus.

BACKGROUND ART

For driving control of a joint of a robot apparatus, depending on mechanical accuracy relating to a backlash or the like, a problem is likely to arise that the robot apparatus does not establish a relationship between the joint angular velocity and the joint torque when the rotation direction of the joint changes from positive rotation to negative rotation or from negative rotation to positive rotation.

To solve the above problem, in a conventional robot apparatus in which driving is controlled in consideration of friction, the driving control is carried out by arbitrarily providing hysteresis called dead zone to a region of near zero velocity (Patent Document 1).

Meanwhile, for control of driving of a control target while friction is taken into consideration, since the control target is influenced by both of Coulomb friction and viscous friction, also it has been proposed to identify and compensate for both of them (Patent Document 2).

Furthermore, it has been proposed that a velocity of a moving object is classified into a region in which the velocity is influenced by Coulomb friction and a region in which the velocity is influenced by viscous friction based on the velocity of a moving object to estimate frictional force in each of the regions with use of a model formula of a discontinuous friction model (Non-Patent Document 1).

PRIOR ART DOCUMENT

Patent Document

Patent Document 1:
 Japanese Patent Laid-Open No. JP7-28527A
Patent Document 2:
 Japanese Patent Laid-Open No. JP7-333084A

Non-Patent Document

Non-Patent Document 1: Ryo Kikuue, Naoyuki Takesue, Akihiko Sano, Hiromi Mochiyama, and Hideo Fujimoto, "Discontinuous Friction Model with Finite-Time Convergence to Zero-Velocity", 10-th Robotics Symposia Proceedings, pp. 215-220, 2005

However, for joint driving control of a robot apparatus while taking friction torque, which is generated by Coulomb friction or by viscous friction and acts upon the joint, into consideration, by introducing a discontinuous friction model or a dead zone, a problem arises as follows. Upon transition from the region in which the driving of a joint is influenced by Coulomb friction to the region in which the driving of a joint is influenced by viscous friction or upon transition from the region in which the driving of a joint is influenced by viscous friction to the region in which the driving of a joint is influenced by Coulomb friction, the estimated friction torque and the friction torque actually acting upon the joint do not coincide with each other at a discontinuous point which is the boundary between the regions and the driving of the joint is not controlled smoothly.

It is a subject of the present invention to solve the above problem which arises when a conventional robot apparatus is used in which driving of a joint is controlled while taking a frictional force torque acting upon the joint into consideration and to provide a robot apparatus in which driving of a joint is controlled smoothly also when the driving transits from a region in which it is influenced by Coulomb friction to a region in which it is influenced by viscous friction or when the driving transits from the region in which it is influenced by viscous friction to the region in which it is influenced by Coulomb friction.

DISCLOSURE OF THE INVENTION

In order to solve the subject described above, according to the present invention, a robot apparatus includes a joint driven by a drive motor, rotational angle detection means which detects a rotational angle of the drive motor, and a control apparatus which carries out, when the control apparatus controls driving of the joint in response to a value detected by the rotational angle detection means, correction with use of an estimated value from a joint torque estimation unit which estimates a joint torque acting upon the joint. In the robot apparatus, the joint torque estimation unit includes an inertial torque estimation unit, a Coriolis force torque estimation unit, a centrifugal force torque estimation unit, a gravitational torque estimation unit and a frictional force torque estimation unit. Further, the frictional torque estimation unit includes a Coulomb frictional force torque estimation unit, a viscous frictional torque estimation unit, and a transition interval arithmetic operation unit which smoothens transition from the Coulomb frictional force torque estimation unit to the viscous frictional force estimation unit and transition from the viscous frictional force torque estimation unit to the Coulomb frictional force torque estimation unit.

Further, according to the present invention, a control method for a robot apparatus for carrying out, when a joint is driven in response to a detection value of a rotational angle of a drive motor, correction with use of an estimation value of a joint torque acting upon the joint, includes obtaining an estimated value of a joint torque of the joint by estimating torques that act upon the joint and include an inertia torque, a Coriolis force torque, a centrifugal force torque, a gravitational torque and a frictional force torque. In addition, the obtaining an estimated value of a joint torque of the joint includes estimating the joint torque of the joint by arithmetically operating, by a transition interval arithmetic operation unit, a frictional force torque during transition from a Coulomb frictional force torque to a viscous frictional force torque and a frictional force torque during transition from the viscous frictional force torque to the Coulomb frictional force torque.

With the present invention, the driving is controlled smoothly even when driving of the joint of the robot apparatus transits from the region in which it is influenced by Coulomb friction to the region in which it is influenced by viscous friction or transits from the region in which it is influenced by viscous friction to the region in which it is influenced by the Coulomb friction.

MODE FOR CARRYING OUT THE INVENTION

In the following, an embodiment of the present invention is described with reference to FIGS. 1 to 8. Here, FIGS. 1 to 8 are views depicting an embodiment of the present invention.

First, an outline of a robot apparatus 1 according to the embodiment of the present invention is described with reference to FIGS. 1 and 2.

Figure 1:
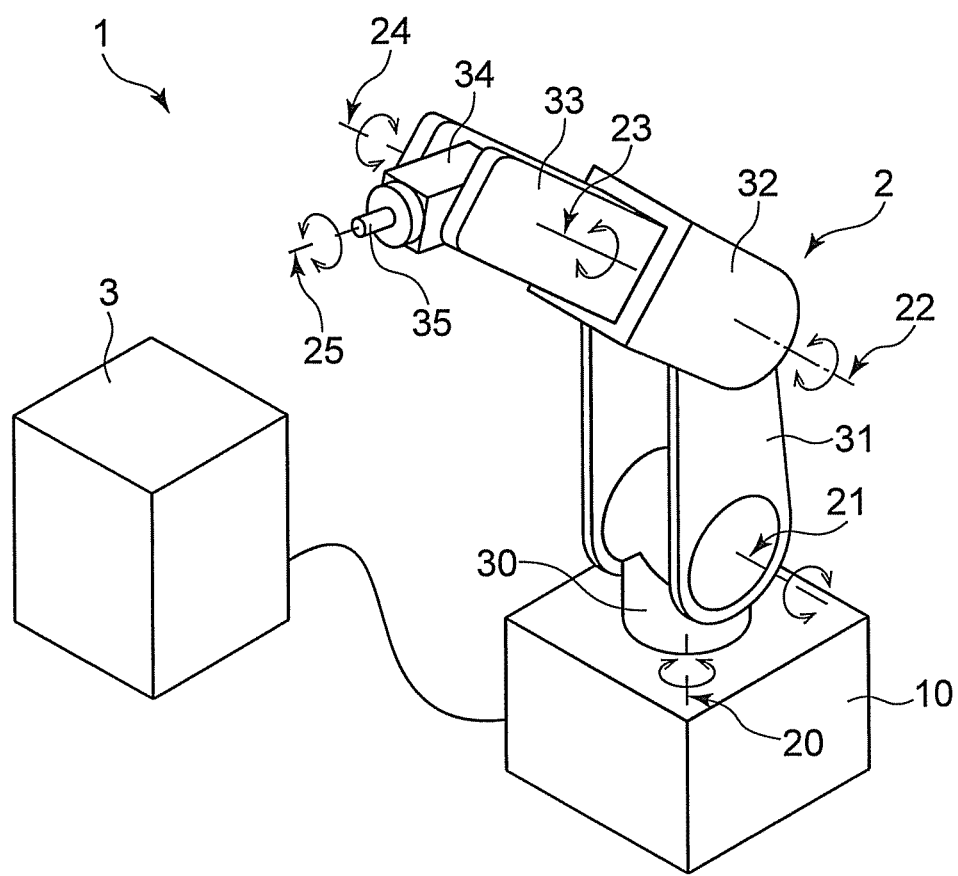
FIG. 1 is a perspective view depicting a robot apparatus according to an embodiment of the present invention.

As depicted in FIG. 1, the robot apparatus 1 includes a robot main body 2, and a control apparatus 3 connected to the robot main body 2 to control driving of the robot main body 2.

The robot main body 2 includes a base 10, and six arm members 30 to 35 (a first arm member 30, a second arm member 31, a third arm member 32, a fourth arm member 33, a fifth arm member 34, and a sixth arm member 35) provided in order from the base 10 and connected to each other through six joints 20 to 25 (a first joint 20, a second joint 21, a third joint 22, a fourth joint 23, a fifth joint 24, and a sixth joint 25).

Figure 2:
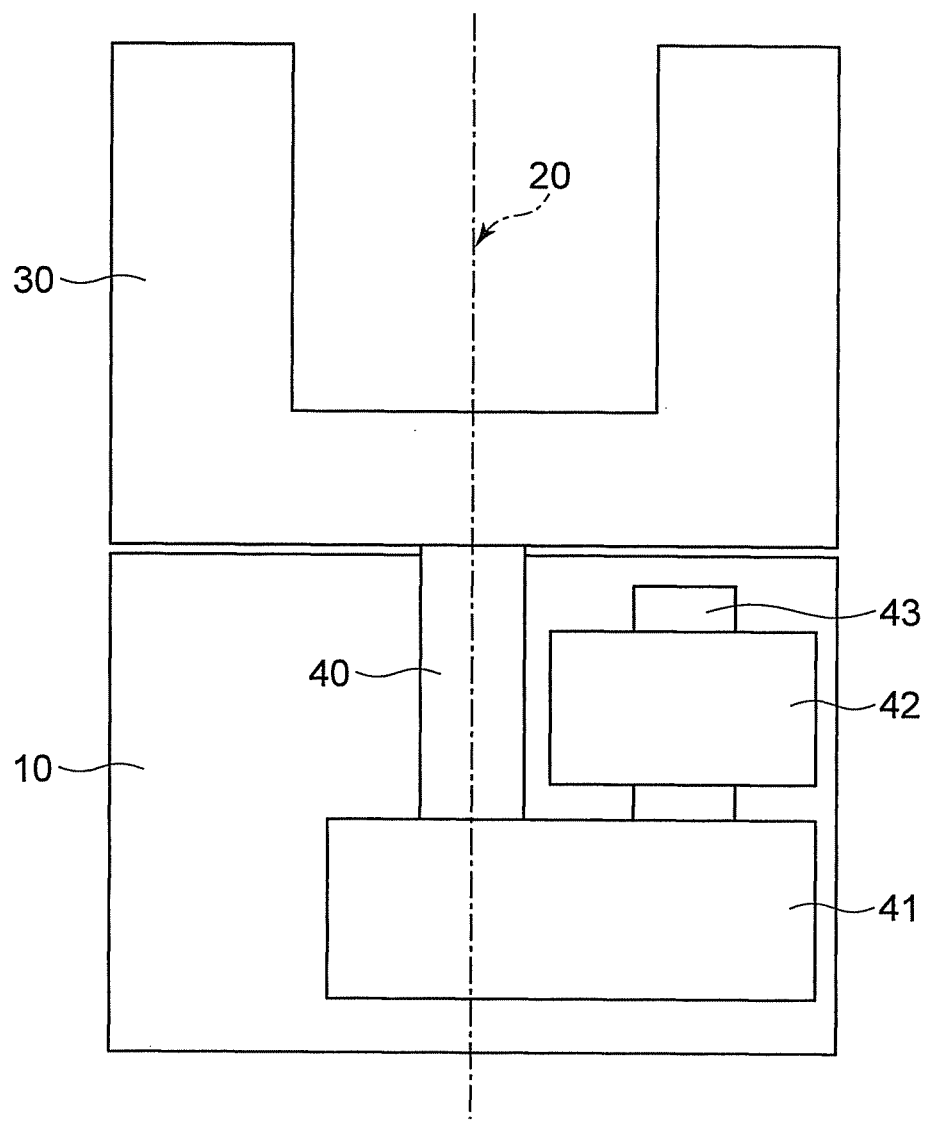
FIG. 2 is a schematic view depicting a structure of a joint of the robot apparatus.

As depicted in FIG. 2, an arm shaft 40 provided integrally on the first arm member 30 and configuring the first joint 20 is connected to the output side of a speed reducer 41 attached at one end thereof to the base 10. A drive motor 42 is connected to the input side of the speed reducer 41 and includes an encoder 43 serving as rotational angle detection means for detecting a rotational angle of the drive motor 42. If the drive motor 42 rotates forwardly or reversely, then the rotation is slowed down by the speed reducer 41 and transmitted to the arm shaft 40, and the first arm member 30 rotates in the forward direction or the reverse direction.

It is to be noted that also the second to sixth joints 21 to 25 each have an arm shaft 40 similarly to the first joint 20 and include a speed reducer 41, a drive motor 42 and an encoder 43 to thereby operate similarly. Therefore, description of them is omitted herein.

Now, the control apparatus 3 is described with reference to FIGS. 3 and 4.

Figure 3:
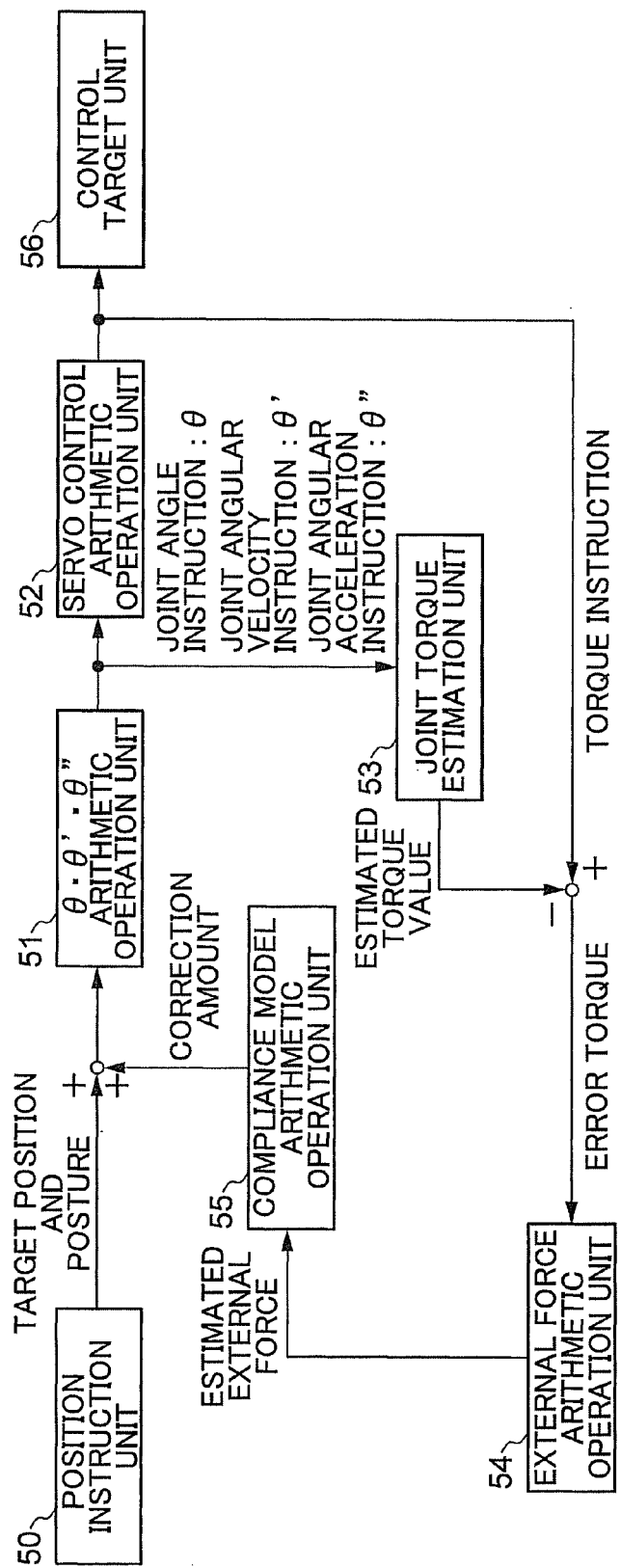
FIG. 3 is a control block diagram of a control apparatus of the robot apparatus.

As depicted in FIG. 3, the control apparatus 3 includes a position instruction unit 50, a θ, θ', θ" arithmetic operation unit 51, a servo control arithmetic operation unit 52, a joint torque estimation unit 53, an external force arithmetic operation unit 54, a compliance model arithmetic operation unit 55, and a control target unit 56.

In the control apparatus 3, the position instruction unit 50 issues an instruction relating to a target position and posture in a predetermined control cycle based on a detection value from the encoder 43 provided for the drive motor 42 of each of the joints 20 to 25 of the robot main body 2. The control target unit 56 receiving the instruction causes each of the drive motors 42 to operate to drive each of the joints 20 to 25.

The θ, θ', θ" arithmetic operation unit 51 adds an instruction relating to a target position and posture calculated by the position instruction unit 50 and a correction amount obtained by the compliance model arithmetic operation unit 55 hereinafter described to carry out arithmetic operation based on inverse kinetics to calculate a joint angle instruction θ, a joint angular velocity instruction θ' and a joint angular acceleration instruction θ".

The servo control arithmetic operation unit 52 calculates a torque instruction to be issued to the control target unit 56 based on the joint angle instruction θ, the joint angular velocity instruction θ' and the joint angular acceleration instruction θ" calculated by the θ, θ', θ" arithmetic operation unit 51.

The joint torque estimation unit 53 estimates a joint torque acting upon each of the joints 20 to 25 based on dynamic models. However, details of such estimation are hereinafter described.

The external force arithmetic operation unit 54 calculates an estimated external force based on an error torque determined by subtracting an estimated torque value for a joint torque estimated by the joint torque estimation unit 53 from a torque instruction calculated by the servo control arithmetic operation unit 52.

The compliance model arithmetic operation unit 55 calculates a correction value for a target position and posture based on an estimated external force calculated by the external force arithmetic operation unit 54.

Here, estimation of a joint torque acting upon each of the joints 20 to 25, which is carried out by the joint torque estimation unit 53, is described in detail.

The joint torque estimation unit 53 estimates a joint torque based on a model formula of a dynamic model.

An estimated joint torque T(Θ) to act upon n joints is represented by the following expression:

$$T(\Theta) = M(\Theta)\Theta'' + B(\Theta)[\Theta a'\Theta b'] + C(\Theta)[\Theta'^2] + G(\Theta) + F(\Theta')$$

The terms of the formula are such as follows:

T(Θ): estimated joint torque matrix (matrix of n rows and one column)

Θ, Θ', Θ": joint angle matrix, joint angular velocity matrix, joint angular acceleration matrix (matrix of n rows and one column), respectively $\Theta'^2$: joint angular velocity product matrix of same joints (matrix of n rows and one column)

Θa'Θb': joint angular velocity product matrix of different joints (matrix of {n·(n−1)/2} rows and one column)

M(Θ): inertia (mass) matrix (matrix of n rows and n columns)

B(Θ): Coriolis force matrix (matrix of n rows and {n·(n−1)/2} columns)

C(Θ): centrifugal force matrix (matrix of n rows and n columns)

G(Θ): gravity matrix (matrix of n rows and one column)

F(Θ'): frictional force matrix (matrix of n rows and one column)

It is to be noted that, in the present embodiment, since the robot main body 2 has the six joints 20 to 25, n=6.

Figure 4:
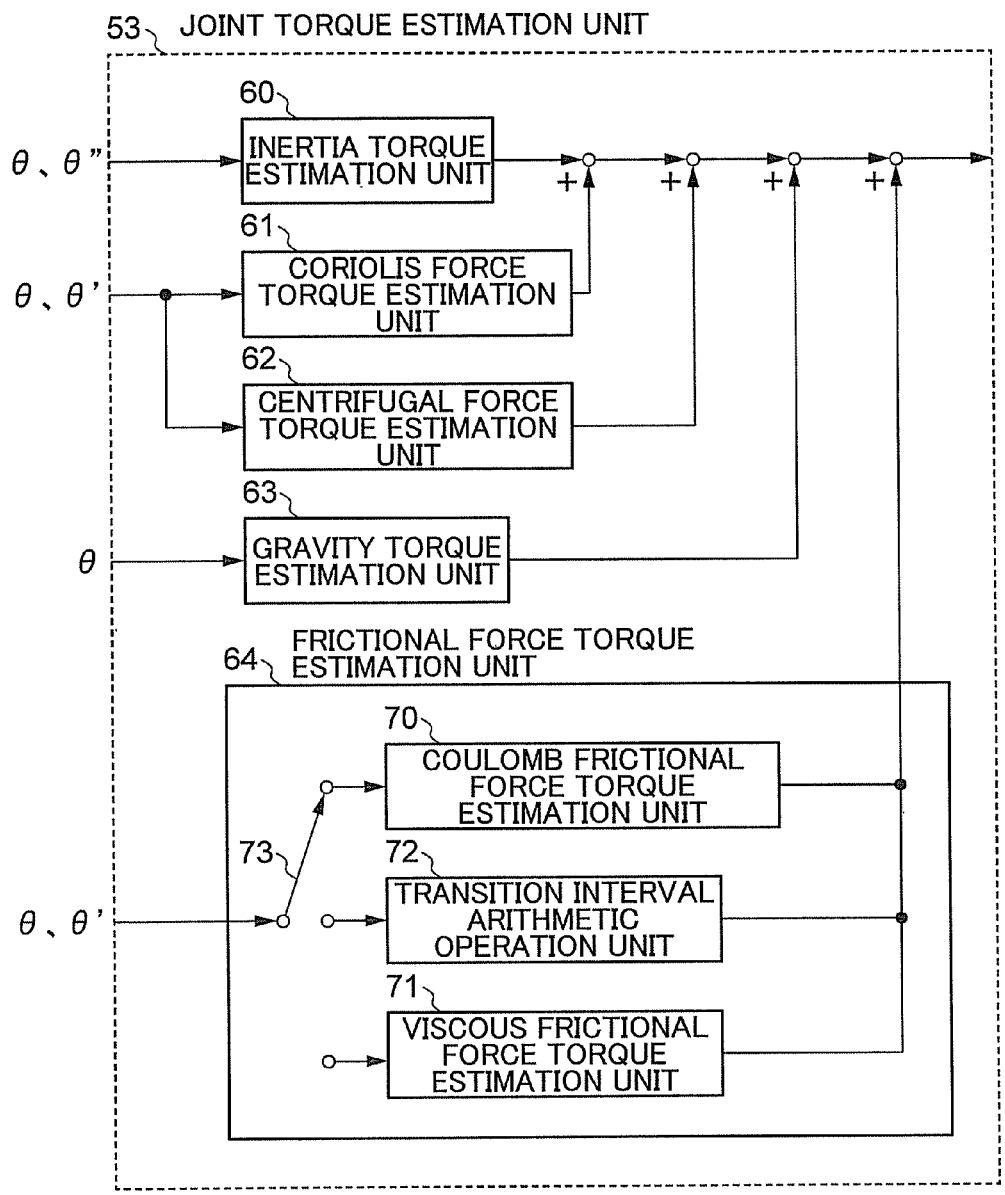
FIG. 4 is a control block diagram of a joint torque estimation unit of the control apparatus.

As depicted in FIG. 4, the joint torque estimation unit 53 includes an inertia torque estimation unit 60, a Coriolis force torque estimation unit 61, a centrifugal force torque estimation unit 62, a gravity torque estimation unit 63 and a frictional force torque estimation unit 64, based on the formula of the estimated joint torque T(Θ) given hereinabove.

The inertia torque estimation unit 60 calculates an inertia torque generated by inertia in accordance with the joint angle instruction θ and the joint angular acceleration instruction θ" issued in the predetermined control cycle, based on the term of M(Θ)Θ" of the estimated joint torque T(Θ) given hereinabove.

The Coriolis force torque estimation unit 61 calculates a Coriolis force torque generated by Coriolis force in response to the joint angle instruction θ and the joint angular velocity instruction θ' generated in the predetermined control cycle, based on the term of B(Θ) [Θa'Θb'] of the formula of the estimated joint torque T(Θ) given hereinabove.

The centrifugal force torque estimation unit 62 calculates a centrifugal force torque generated by centrifugal force in response to the joint angle instruction θ and the joint angular velocity instruction θ' issued in the predetermined control cycle, based on the term of C(Θ) [Θ'$^2$] of the formula of the estimated joint torque T(Θ) given hereinabove.

The gravity torque estimation unit 63 calculates a gravitational torque generated by the gravity in response to the joint angle instruction θ generated in the predetermined control cycle, based on the term of G(Θ) of the formula of the estimated joint torque T(Θ) given hereinabove.

The frictional force torque estimation unit 64 calculates a frictional force torque generated by frictional force in response to the joint angle instruction θ and the joint angular velocity instruction θ' generated in the predetermined control cycle, based on the term of F(Θ') of the formula of the estimated joint torque T(Θ) given hereinabove.

The joint torque estimation unit 53 adds an inertia torque calculated by the inertia torque estimation unit 60, a Coriolis force torque calculated by the Coriolis force torque estimation unit 61, a centrifugal force torque calculated by the centrifugal force torque estimation unit 62, a gravitational torque calculated by the gravity torque estimation unit 63 and a frictional force torque calculated by the frictional force torque estimation unit 64 to estimate a joint torque and obtains an estimated value for the joint torque.

When frictional force torques acting upon the joints 20 to 25 are calculated, the friction acting upon each of the joints 20 to 25 transits from the Coulomb friction to the viscous friction as the joint angular velocity increases, and the friction acting upon each of the joints 20 to 25 transits from the viscous friction to the Coulomb friction as the joint angular velocity decreases. Therefore, the frictional force torque estimation unit 64 includes a Coulomb frictional force torque estimation unit 70 which calculates based on a model formula of a Coulomb friction model and a viscous frictional force torque estimation unit 71 which calculates based on a model formula of a viscous friction model.

Further, when the model formula of the Coulomb friction model and the model formula of the viscous friction model are discontinuous, in order to avoid disorder of driving of the joints 20 to 25 caused by a sudden change of the estimated frictional force torque before and after the joint angular velocity at which the connection between the model formulas is discontinuous, the frictional force torque estimation unit 64 further includes a transition interval arithmetic operation unit 72 which smoothens the transition from the Coulomb frictional force torque estimation unit 70 to the viscous frictional force torque estimation unit 71 and the transition from the viscous frictional force torque estimation unit 71 to the Coulomb frictional force torque estimation unit 70.

The frictional force torque estimation unit 64 includes also a changeover switch 73 for selecting one of the Coulomb frictional force torque estimation unit 70, viscous frictional force torque estimation unit 71 and transition interval arithmetic operation unit 72 in response to the joint angular velocity.

Now, estimation of a frictional force torque by the Coulomb frictional force torque estimation unit 70, viscous frictional force torque estimation unit 71 and transition interval arithmetic operation unit 72, and changeover by the changeover switch 73 are described.

The Coulomb frictional force torque estimation unit 70 arithmetically operates and estimates a Coulomb frictional force torque $Fc(\theta)$ acting upon each of the joints 20 to 25 based on a formula of $Fc(\theta)=fc\times sgn(\theta')$ in response to the joint angle instruction θ and the joint angular velocity instruction θ' to each of the joints 20 to 25 in conformity with the Coulomb friction model. It is to be noted that fc represents a predetermined constant in conformity with the model formula of the Coulomb friction model.

The viscous frictional force torque estimation unit 71 arithmetically operates and estimates a viscous frictional force torque $Fv(\theta)$ acting upon each of the joints 20 to 25 based on a formula of $Fv(\theta)=fv(\theta')$ in response to the joint angle instruction θ and the joint angular velocity instruction θ' to each of the joints 20 to 25 in conformity with the viscous friction model. It is to be noted that $fv(\theta')$ represents a predetermined function in conformity with the model formula of the viscous friction model which includes the joint angular velocity instruction θ' as a variable.

The transition interval arithmetic operation unit 72 arithmetically operates and estimates a transition interval frictional force torque $Ft(\theta)$ acting upon each of the joints 20 to 25 based on a formula of $Ft(\theta)=k\times(\theta-\theta s)+fc\times sgn(\theta')$ in response to the joint angle instruction θ and the joint angular velocity instruction θ' to each of the joints 20 to 25. It is to be noted that k represents a frictional force torque coefficient hereinafter described, and θs represents a joint angle instruction upon preceding instruction in a predetermined control cycle.

The frictional force torque coefficient k is determined by driving each of the joints 20 to 25 in advance, measuring a junction torque acting upon each of the joints 20 to 25 upon transition from Coulomb friction to viscous friction caused by an increase of the joint angle and analyzing a result of the measurement. The current value of the drive motor 42 and the detection value of the encoder 43 for each of the joints 20 to 25 are measured by a plural number of times in a predetermined sampling cycle, and the current value of the drive motor 42 is converted into a joint torque and the detection value of the encoder 43 is converted into a joint angle. On the bases of dimensions, a weight and so forth of the robot main body 2, an inertia torque, a Coriolis force torque, a centrifugal force torque and a gravitational torque having acted upon each of the joints 20 to 25 upon the measurement are calculated, and they are subtracted from the joint torques obtained by the conversion to extract frictional force torques having acted upon the joints 20 to 25 upon the measurement. From the joint angles obtained by the conversion and the extracted frictional force torques, a relationship $Fm(\theta)$ between the joint angle and the frictional force torque based on the measurement is obtained.

Generally, the relationship $Fm(\theta)$ between the joint angle and the frictional force torque based on the measurement indicates that, although, in a region in which the joint angle is very small, the frictional force torque is substantially fixed with respect to a variation of the joint angle by an influence of the Coulomb friction, the frictional force torque increases smoothly in accordance with an increase of the joint angle where the very small region is exceeded. In the region in which the frictional force torque increases smoothly, an inclination km of the frictional force torque with respect to the junction angle is detected, and the inclination km is determined as frictional force torque coefficient k.

It is to be noted that, while, in the present embodiment, a current value of the drive motor 42 is converted into a joint torque and a detection value of the encoder 43 is converted into a joint angle, the joint torque and the joint angle may be measured using some other measuring instrument.

Further, if a plurality of robot apparatus 1 exist, then it is preferable to determine the frictional force torque coefficient k with regard to each robot apparatus 1. However, where the plurality of robot apparatus 1 have been manufactured by the same process and have same specifications, the frictional force torque coefficient k of one of the robot apparatus 1 may be determined and applied to the remaining robot apparatus 1.

The changeover switch 73 selects one of the Coulomb frictional force torque estimation unit 70, viscous frictional force torque estimation unit 71 and transition interval arithmetic operation unit 72 in response to the joint angular velocity instruction $\theta'$ to each of the joints 20 to 25.

When the rotation direction of each of the joints 20 to 25 is forward rotation, the joint angular velocity instruction $\theta'$ has a positive value, and when the rotation direction of each of the joints 20 to 25 is reverse rotation, the joint angular velocity instruction $\theta'$ has a negative value.

When the joint angular velocity instruction $\theta$ is within a range of $0 \leq |\theta'| \leq \theta1'$ ($0<\theta1'$), the changeover switch 73 selects the Coulomb frictional force torque estimation unit 70 for connection thereto, and the frictional force torque estimation unit 64 arithmetically operates by the Coulomb frictional force torque estimation unit 70 thereof to estimate a frictional force torque to act upon each of the joints 20 to 25. It is to be noted that $\theta1'$ represents a Coulomb friction switching joint velocity instruction $\theta1'$, which is hereinafter described.

When the joint angular velocity instruction $\theta'$ is within a range of $\theta1'<|\theta'|<\theta2'$ ($\theta1'<\theta2'$), the changeover switch 73 selects the transition interval arithmetic operation unit 72 for connection thereto, and the frictional force torque estimation unit 64 arithmetically operates by the transition interval arithmetic operation unit 72 thereof to estimate a frictional force torque to act upon each of the joints 20 to 25. It is to be noted that $\theta2'$ represents a viscous friction switching joint velocity instruction $\theta2'$, which is hereinafter described.

When the joint angular velocity instruction $\theta'$ is within a range of $\theta2' \leq |\theta'|$, the changeover switch 73 selects the viscous frictional force torque estimation unit 71 for connection thereto, and the frictional force torque estimation unit 64 arithmetically operates by the viscous frictional force torque estimation unit 71 thereof to estimate a frictional force torque acting upon each of the joints 20 to 25.

It is to be noted that direct changeover from the Coulomb frictional force torque estimation unit 70 to the viscous frictional force torque estimation unit 71 and direct changeover from the viscous frictional force torque estimation unit 71 to the Coulomb frictional force torque estimation unit 70 are not carried out.

For the Coulomb friction switching joint velocity instruction $\theta1'$, the joint angular velocity at which $Fm(\theta)$ is greater than $Fc(\theta)$ is applied after comparing a Coulomb frictional force torque $Fc(\theta)$ calculated in conformity with the Coulomb friction model by the Coulomb frictional force torque estimation unit 70 and a relationship $Fm(\theta)$ between the joint angle and the frictional force torque, which is based on measurement.

For the viscous friction switching joint velocity instruction $\theta2'$, the join angular velocity at which $Fm(\theta)$ reaches a minimum value of $Fv(\theta)$ is applied after comparing a viscous frictional force torque $Fv(\theta)$ calculated in conformity with the viscous friction model by the viscous frictional force torque estimation unit 71 and a relationship $Fm(\theta)$ between the joint angle and the frictional force torque, which is based on measurement.

In the present embodiment, changeover between the Coulomb frictional force torque estimation unit 70 and the transition interval arithmetic operation unit 72 and changeover between the viscous frictional force torque estimation unit 71 and the transition interval arithmetic operation unit 72 by the changeover switch 73 are carried out by comparing the joint angular velocity instruction $\theta'$ with the Coulomb friction switching joint velocity instruction $\theta1'$ and the viscous friction switching joint velocity instruction $\theta2'$. However, a condition for such switching may be suitably changed or added.

For example, in the present embodiment, the changeover from the transition interval arithmetic operation unit 72 to the viscous frictional force torque estimation unit 71 is carried out at a point of time at which the joint angular velocity instruction $\theta'$ becomes greater than the viscous friction switching joint velocity instruction $\theta2'$ ($\theta2' \leq |\theta'|$). However, the changeover may be carried out at a point of time at which the joint angular velocity instruction $\theta'$ becomes greater than the viscous friction switching joint velocity instruction $\theta2'$ ($\theta2'<|\theta'|$) and besides the transition interval frictional force torque $Ft(\theta)$ becomes greater than a minimum value of the viscous frictional force torque $Fv(\theta)$ (|minimum value of $Fv(\theta)|<|Ft(\theta)|$).

In the present embodiment, measurement of the joint torque, analysis of the measurement result, acquisition of the relationship $Fm(\theta)$ between the joint angle and the frictional force torque, which is based on the measurement, acquisition of the inclination km of the frictional force torque with respect to the joint angle and acquisition of the Coulomb friction switching joint velocity instruction $\theta1'$ and the viscous friction switching joint velocity instruction $\theta2'$ are carried out offline by an operator. However, program software may be added for execution of those by the control apparatus 3.

Figure 5:
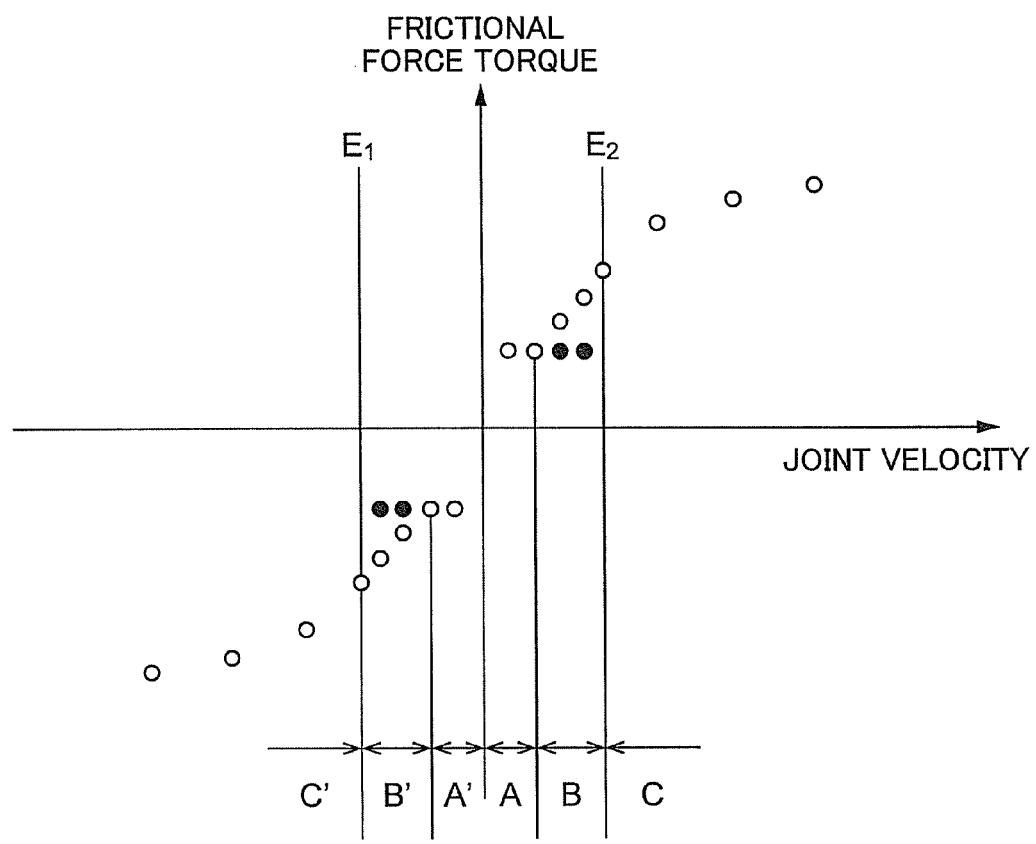
FIG. 5 is a graph illustrating a friction torque estimated by a friction torque estimation unit of the joint torque estimation unit.

FIG. 5 depicts a graph of the frictional force torque estimated for the joints 20 to 25 by the frictional force torque estimation unit 64 in the present embodiment.

The axis of abscissa indicates the joint angular velocity and the axis of ordinate indicates the frictional force torque, and a blank round mark (○) indicates a frictional force torque estimated by the frictional force torque estimation unit 64.

In an interval A and another interval A', the joint angular velocity instruction $\theta'$ is within the range of $0 \leq |\theta'| \leq \theta1'$, and the frictional force torque estimation unit 64 arithmetically operates by the Coulomb frictional force torque estimation unit 70 thereof to estimate the frictional force torque in the predetermined control cycle.

In an interval B and another interval B', the joint angular velocity instruction $\theta'$ is within the range of $\theta1' \leq |\theta'| \leq \theta2'$, and the frictional force torque estimation unit 64 arithmetically operates by the transition interval arithmetic operation unit 72 thereof to estimate the frictional force torque in the predetermined control cycle.

In an interval C and another interval C', the joint angular velocity instruction θ' is within the range of θ2'≤|θ'|, and the frictional force torque estimation unit 64 arithmetically operates by the viscous frictional force torque estimation unit 71 thereof to estimate the frictional force torque in the predetermined control cycle.

The friction torques within each of the intervals B and B' estimated by the transition interval arithmetic operation unit 72 smoothly connect the respective frictional force torques within each of the intervals A and A' estimated based on the model formula of the Coulomb friction mode to the respective frictional force torques within each of the intervals C and C' estimated based on the model formula of the viscous friction model.

As indicated by a solid round mark (●) in each of the intervals B and B', if the frictional force torque within the intervals is estimated by the Coulomb frictional force torque estimation unit 70 as in the past, then the frictional torque varies suddenly on the boundaries between the interval B and the interval C and between the interval B' and the interval C'. Therefore, there is the possibility that driving of the joints 20 to 25 may be disordered.

According to the present embodiment, since the frictional force torque estimation unit 64 includes the transition interval arithmetic operation unit 72, transition from the Coulomb frictional force torque estimation unit 70 to the viscous frictional force torque estimation unit 71 through the transition interval arithmetic operation unit 72 and from the viscous frictional force torque estimation unit 71 to the Coulomb frictional force torque estimation unit 70 through the transition interval arithmetic operation unit 72 is carried out smoothly.

Now, operation of the robot apparatus 1 according to the present embodiment is described with reference to a flow chart depicted in FIG. 6.

Figure 6:
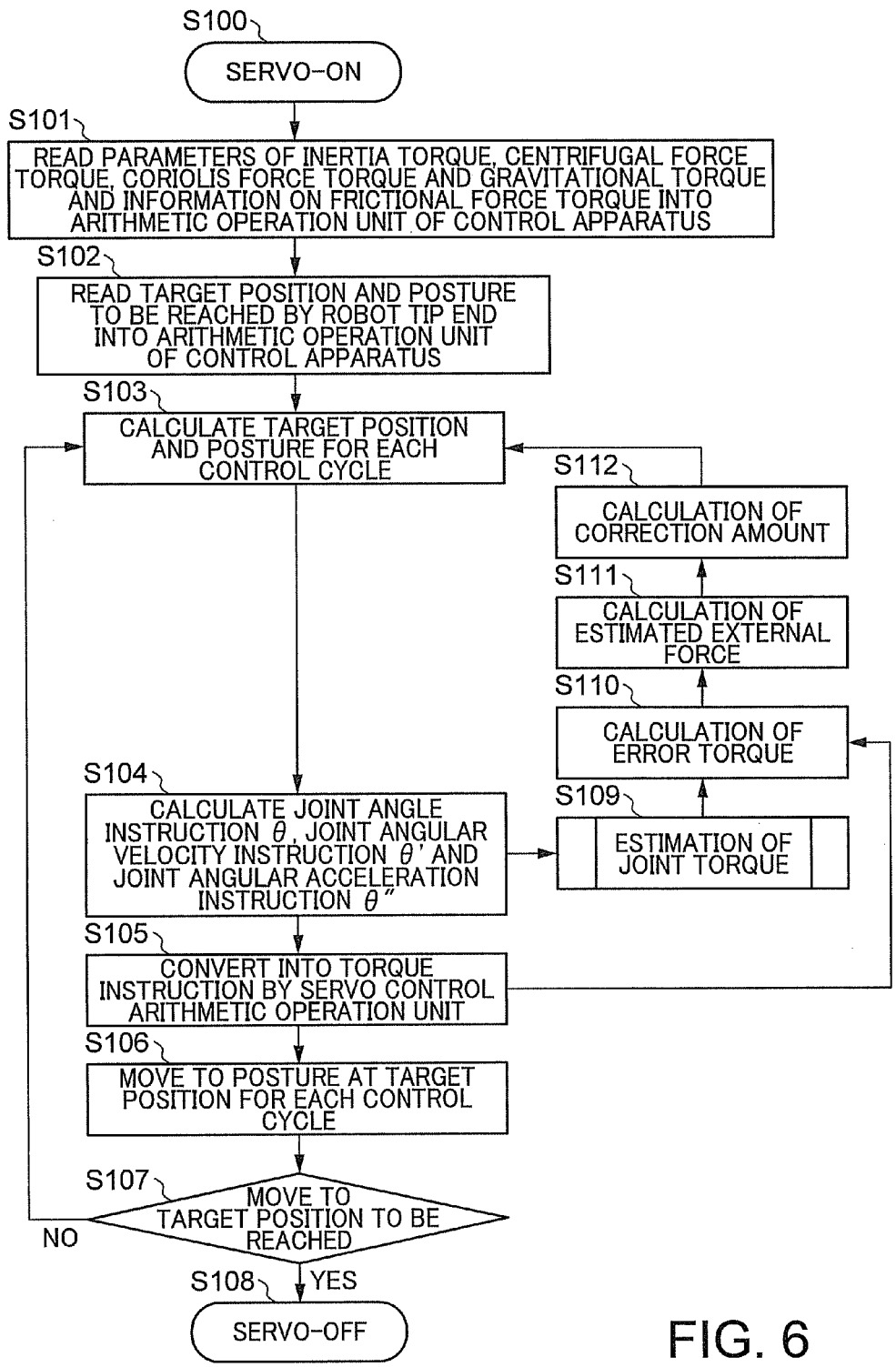
FIG. 6 is a flow chart of the robot apparatus depicted in FIG. 1.

The robot apparatus 1 is controlled in such a manner as represented by the flow chart depicted in FIG. 6.

The robot apparatus 1 is placed into a servo-on state and the control apparatus 3 is activated at step S100.

At step S101, the control apparatus 3 reads in parameters of the formula of the estimated joint torque T(Θ), which is based on the dynamics model stored in the memory thereof. The parameters read in are applied to the inertia torque estimation unit 60, Coriolis force torque estimation unit 61, centrifugal force torque estimation unit 62 and gravity torque estimation unit 63 of the joint torque estimation unit 53. The parameters include an arm mass, a link offset amount, a gravity center offset, an inertial moment around the gravity center and so forth, which are determined in advance based on the dimensions and the masses of the robot main body 2. The parameters further include information relating the formula of the Coulomb frictional force torque Fc(θ) of the Coulomb frictional force torque estimation unit 70, information relating to the formula of the viscous frictional force torque Fv(θ) of the viscous frictional force torque estimation unit 71, the frictional force torque coefficient k of the formula of the transition interval frictional force torque Ft(θ) of the transition interval arithmetic operation unit 72, the Coulomb friction switching joint velocity instruction θ1' of the changeover switch 73, which are included in the frictional force torque estimation unit 64, the viscous friction switching joint velocity instruction θ2' and so forth.

At step S102, the control apparatus 3 reads in a target position and posture of the robot main body 2 to be reached, which is stored in the memory thereof.

At step S103, the control apparatus 3 calculates, by the position instruction unit 50 thereof, a target position and posture in the predetermined control cycle based on a detection value of the encoder 43 provided in the drive motor 42 of each of the joints 20 to 25 and issues an instruction relating to the target position and posture.

At step S104, the control apparatus 3 carries out, by the θ, θ', θ" arithmetic operation unit 51 thereof, arithmetic operation based on the inverse kinetics based on the instruction relating to the target position and posture to calculate a joint angle instruction θ, a joint angular velocity instruction θ' and a joint angular acceleration instruction θ".

At step S105, the control apparatus 3 calculates, by the servo control arithmetic operation unit 52 thereof, a torque instruction value based on the joint angle instruction θ, joint angular velocity instruction θ' and joint angular acceleration instruction θ".

At step S106, the control apparatus 3 causes the control target unit 56 to operate the drive motors 42 based on the torque instructions to rotate the joints 20 to 25 of the robot main body 2.

At step S107, if the positions and the postures of the joints 20 to 25 of the robot main body 2 exhibit target values to be individually reached, then the control apparatus 3 advances the processing to step S108, at which the control apparatus 3 establishes a servo-off state. If the target values are not reached, then the processing returns to step S103.

It is to be noted that, the control apparatus 3 estimates, at step S109, by the joint torque estimation unit 53 thereof, a joint torque to act upon each of the joints 20 to 25 based on the joint angle instruction θ, joint angular velocity instruction θ' and joint angular acceleration instruction θ" calculated at step S104, and subtracts, at step S110, the torque instructions calculated at step S105 from the estimated torque values of the estimated joint torques to calculate error torques.

At step S111, the control apparatus 3 calculates, by the external force arithmetic operation unit 54 thereof, estimated external force based on the error torques. At step S112, the control apparatus 3 arithmetically operates, by the compliance model arithmetic operation unit 55 thereof, correction values for the target positions and postures based on the estimated external force.

The correction values for the target positions and postures are added to the target positions and postures arithmetically operated at step S103. The calculated target positions and postures are those determined taking compliance control taken into consideration.

Figure 7:
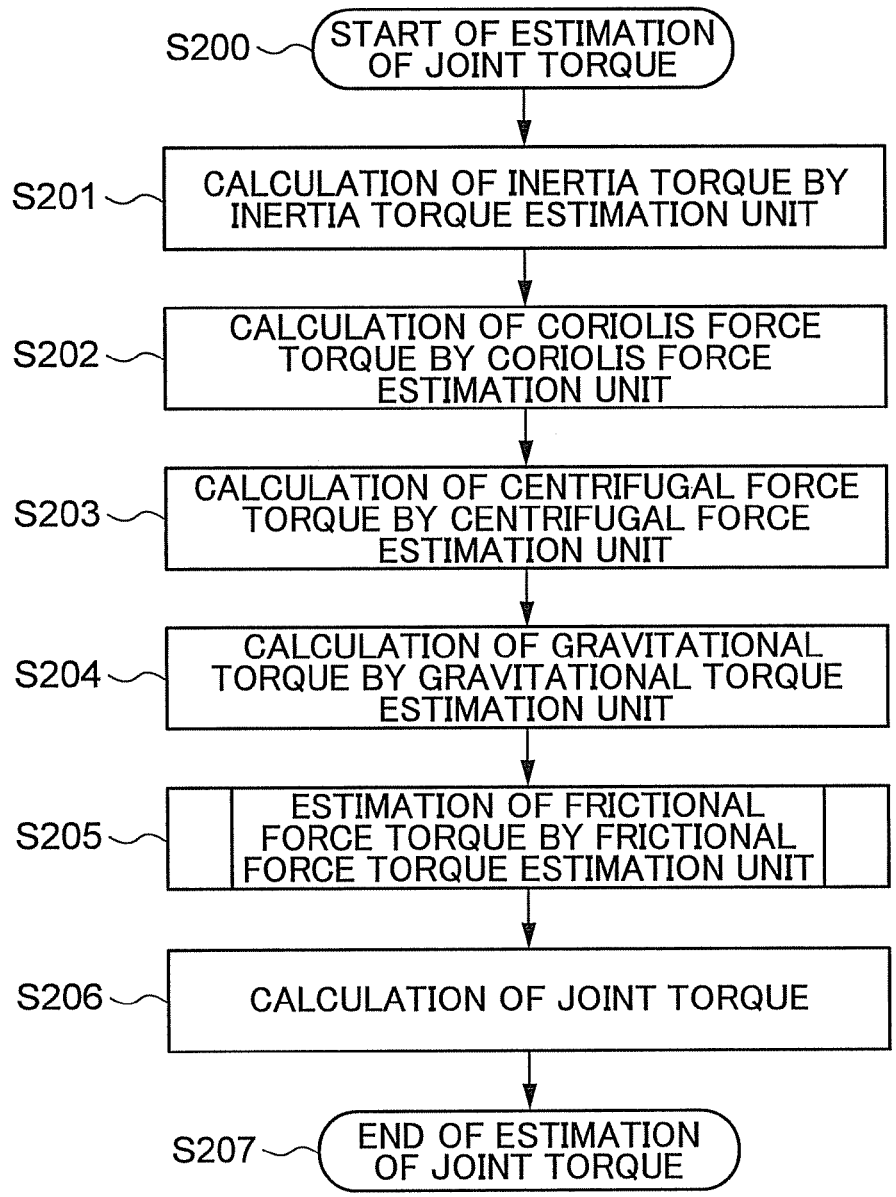
FIG. 7 is a flow chart of the joint torque estimation unit.

Now, operation of the joint torque estimation unit 53 is described with reference to a flow chart depicted in FIG. 7.

The joint torque estimation unit 53 starts estimation of the joint torque at step S200.

At step S201, the joint torque estimation unit 53 calculates an inertia torque by the inertia torque estimation unit 60 thereof.

At step S202, the joint torque estimation unit 53 calculates a Coriolis force torque by the Coriolis force torque estimation unit 61 thereof.

At step S203, the joint torque estimation unit 53 calculates a centrifugal force torque by the centrifugal force torque estimation unit 62 thereof.

At step S204, the joint torque estimation unit 53 calculates a gravitational torque by the gravity torque estimation unit 63 thereof.

At step S205, the joint torque estimation unit 53 calculates a frictional force torque by the frictional force torque estimation unit 64 thereof.

At step S206, the joint torque estimation unit 53 adds the inertial torque, Coriolis force torque, centrifugal force torque, gravitational torque and frictional force torque calculate at steps S201 to S205, respectively, to estimate a joint torque.

Then at step S207, the joint torque estimation unit 53 ends the estimation of a joint torque.

Figure 8:
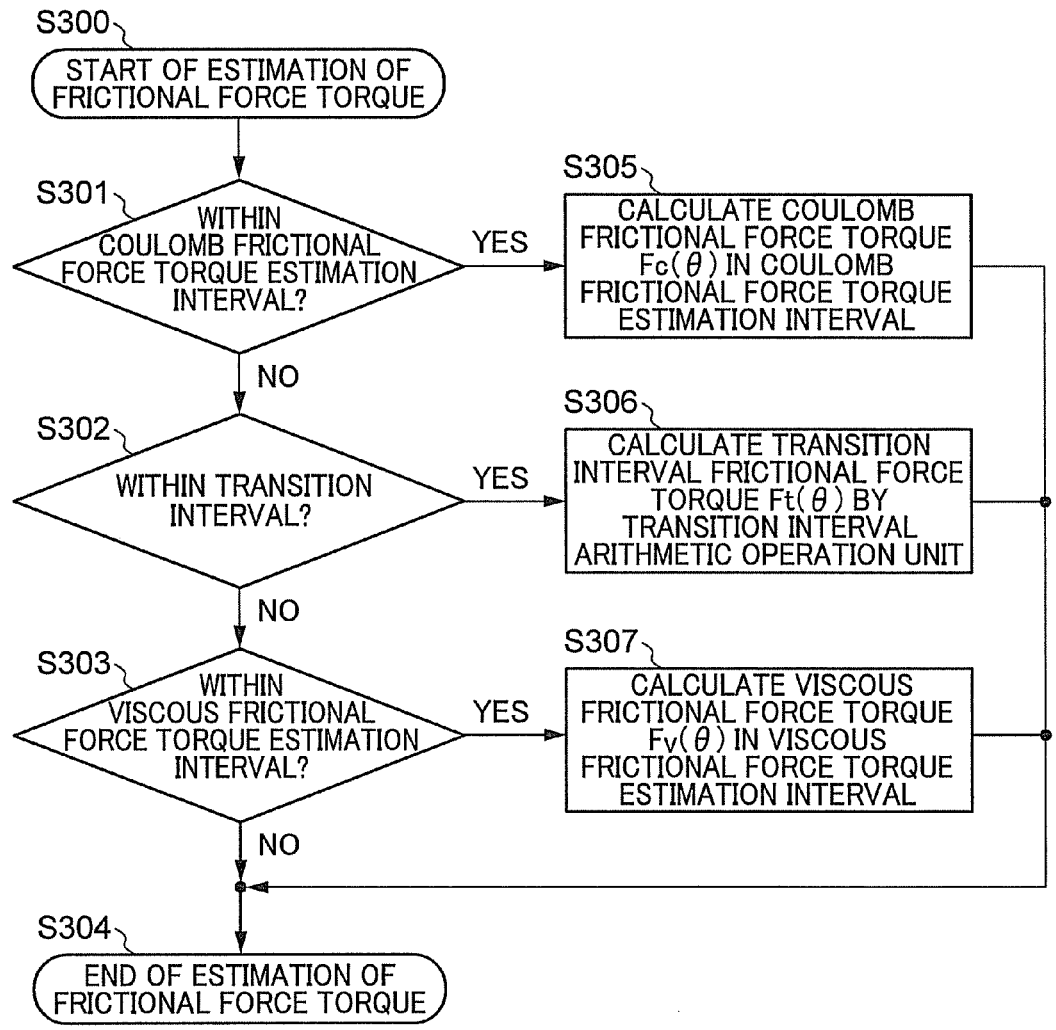
FIG. 8 is a flow chart of the friction torque estimation unit.

Now, operation of the frictional force torque estimation unit 64 is described with reference to a flow chart depicted in FIG. 8.

The frictional force torque estimation unit 64 starts estimation of a frictional force torque at step S300.

At step S301, the frictional force torque estimation unit 64 determines by the changeover switch 73 thereof whether or not the joint angular velocity instruction $\theta'$ is within a Coulomb frictional force torque estimation interval, namely, whether or not the joint angular velocity instruction $\theta'$ is within the range of $0 \leq |\theta'| \leq \theta 1'$. If the joint angular velocity instruction $\theta'$ is within the range of $0 \leq |\theta'| \leq \theta 1'$, then the processing advances to step S305, but if not within the range of $0 \leq |\theta'| \leq \theta 1'$, then the processing advances to step S302.

At step S305, the frictional force torque estimation unit 64 arithmetically operates the Coulomb frictional force torque Fc($\theta$) by the Coulomb frictional force torque estimation unit 70 thereof to estimate a frictional force torque.

At step S302, the frictional force torque estimation unit 64 determines by the changeover switch 73 thereof whether or not the joint angular velocity instruction $\theta'$ is within the transition interval, namely, whether or not the joint angular velocity instruction $\theta'$ is within the range of $\theta 1' \leq |\theta'| \leq \theta 2'$. If the joint angular velocity instruction $\theta'$ is within the range of $\theta 1' \leq |\theta'| \leq \theta 2'$, then the processing advances to step S306, but if not within the range of $\theta 1' \leq |\theta'| \leq \theta 2'$, then the processing advances to step S303.

At step S306, the frictional force torque estimation unit 64 arithmetically operates the transition interval frictional force torque Ft($\theta$) by the transition interval arithmetic operation unit 72 thereof to estimate a frictional force torque.

At step S303, the frictional force torque estimation unit 64 determines by the changeover switch 73 thereof whether or not the joint angular velocity instruction $\theta'$ is within a viscous frictional force torque estimation interval, namely, whether or not the joint angular velocity instruction $\theta'$ is within the range of $\theta 2' \leq |\theta'|$. If the joint angular velocity instruction $\theta'$ is within the range of $\theta 2' \leq |\theta'|$, then the processing advances to step S307, but if not within the range of $\theta 2' \leq |\theta'|$, then it is determined that a frictional force torque is not estimated and the processing advances to step S304.

At step S307, the frictional force torque estimation unit 64 arithmetically operates a viscous frictional force torque Fv($\theta$) by the viscous frictional force torque estimation unit 71 thereof to estimate a frictional force torque.

At step S304, the frictional force torque estimation unit 64 ends the estimation of a frictional force torque.

It is to be noted that, when the present invention is implemented, it can be implemented by adding appropriate alteration based on a particular configuration of the robot apparatus. The number of joints of the robot main body, the number of arm members and the number of controlling points of a control apparatus for controlling the robot apparatus are determined according to a work to execute.

The invention claimed is:

1. A robot apparatus comprising:
a joint driven by a drive motor;
a rotational angle detector configured to detect a rotational angle of the drive motor; and
a control apparatus comprising a joint torque estimation unit configured to estimate a joint torque acting upon the joint, the control apparatus configured to:
drive the joint in response to a value detected by the rotational angle detector, and
use the estimated value from the joint torque estimation unit to correct the driving of the joint,
the joint torque estimation unit including an inertial torque estimation unit, a Coriolis force torque estimation unit, a centrifugal force torque estimation unit, a gravitational torque estimation unit and a frictional force torque estimation unit;
the frictional torque estimation unit including a Coulomb frictional force torque estimation unit, a viscous frictional force torque estimation unit, and a transition interval arithmetic operation unit configured to arithmetically operate based on a formula at Ft $\theta$=k x ($\theta-\theta$s) +fc x sgn($\theta'$) for a smooth transition from the Coulomb frictional force torque estimation unit to the viscous frictional force torque estimation unit and a smooth transition from the viscous frictional force torque estimation unit to the Coulomb frictional force torque estimation unit,
wherein Ft($\theta$) represents a transition interval frictional force torque, k represents a frictional force torque coefficient, $\theta$ represents a joint angle instruction, $\theta$s represents a joint angle instruction upon a proceeding instruction in a predetermined control cycle, fc is a constant, and $\theta'$ represents a joint angular velocity instruction.

2. The robot apparatus according to claim 1, wherein the transition interval arithmetic operation unit is configured to arithmetically operate the frictional force torque of the joint by using a frictional force torque coefficient extracted from a joint torque of the joint, the joint torque being measured in advance.

3. A control method for a robot apparatus for carrying out, when a joint is driven in response to a detection value of a rotational angle of a drive motor, correction using an estimated value of a joint torque acting upon the joint, the control method comprising:
obtaining the estimated value of the joint torque of the joint by estimating torques that act upon the joint, the torques including an inertia torque, a Coriolis force torque, a centrifugal force torque, a gravitational torque, and a frictional force torque;
the obtaining an estimated value of the joint torque of the joint including estimating the joint torque of the joint by arithmetically operating, by a transition interval arithmetic operation unit, a frictional force torque based on a formula of Ft($\theta$)=kx($\theta-\theta$s)+fcxsgn($\theta'$) during transition from a Coulomb frictional force torque to a viscous frictional force torque and a frictional force torque during transition from the viscous frictional force torque to the Coulomb frictional force torque,
wherein Ft($\theta$) represents a transition interval frictional force torque, k represents a frictional force torque coefficient, $\theta$ represents a joint angle instruction, $\theta$s represents a joint angle instruction upon a proceeding instruction in a predetermined control cycle, fc is a constant and $\theta'$ represents a joint angular velocity instruction.

4. The control method for a robot apparatus according to claim 3, wherein the transition interval arithmetic operation unit is configured to arithmetically operate the frictional force torque of the joint by using a frictional force torque coefficient extracted from a joint torque of the joint, the joint torque being measured in advance.

* * * * *